United States Patent
Livshiz et al.

[11] Patent Number: 5,824,998
[45] Date of Patent: Oct. 20, 1998

[54] JOINING OR WELDING OF METAL OBJECTS BY A PULSED MAGNETIC FORCE

[75] Inventors: Yuri Livshiz, Ariel; Oren Gafri, Rishon Le-Zion, both of Israel

[73] Assignee: Pulsar Welding Ltd., Rishon-le-Zion, Israel

[21] Appl. No.: 575,321

[22] Filed: Dec. 20, 1995

[51] Int. Cl.⁶ .................................................. H05B 6/06
[52] U.S. Cl. .................... 219/617; 219/603; 219/662; 219/656; 219/630; 72/56
[58] Field of Search .................. 219/602, 605, 219/617, 662, 656, 671, 603, 670; 72/56

[56] References Cited

U.S. PATENT DOCUMENTS

| | | | |
|---|---|---|---|
| 1,980,875 | 11/1934 | Northrup ................................ | 219/662 |
| 2,792,674 | 5/1957 | Balamuth et al. . | |
| 2,811,623 | 10/1957 | Guthrie .................................. | 219/656 |
| 2,985,954 | 5/1961 | Jones et al. . | |
| 3,017,483 | 1/1962 | Anderson .............................. | 219/605 |
| 3,021,413 | 2/1962 | Blok ....................................... | 219/656 |
| 3,029,666 | 4/1962 | Lovins . | |
| 3,033,359 | 5/1962 | Mercer . | |
| 3,053,124 | 9/1962 | Balamuth et al. . | |
| 3,054,309 | 9/1962 | Elmore et al. . | |
| 3,055,098 | 9/1962 | Bratkowski et al. . | |
| 3,056,192 | 10/1962 | Jones . | |
| 3,166,840 | 1/1965 | Bancroft et al. . | |
| 3,184,353 | 5/1965 | Balamuth et al. . | |
| 3,209,447 | 10/1965 | Jones . | |
| 3,360,849 | 1/1968 | Forman et al. . | |
| 3,384,283 | 5/1968 | Mims . | |
| 3,420,079 | 1/1969 | Erlandson . | |
| 3,456,338 | 7/1969 | Mohrman et al. . | |
| 3,495,427 | 2/1970 | Balamuth . | |
| 3,603,760 | 9/1971 | Chejuskintsev et al. ............. | 219/617 |
| 3,609,851 | 10/1971 | McMaster et al. . | |
| 3,654,787 | 4/1972 | Brower . | |
| 3,794,805 | 2/1974 | Rudd ....................................... | 219/617 |
| 3,823,589 | 7/1974 | Tikhonovich et al. ................ | 72/56 |
| 3,961,739 | 6/1976 | Leftheris . | |
| 4,170,887 | 10/1979 | Baranov . | |
| 4,285,224 | 8/1981 | Shkatov et al. . | |
| 4,300,031 | 11/1981 | Reboux et al. ....................... | 219/670 |
| 4,326,903 | 4/1982 | Summo . | |
| 4,513,188 | 4/1985 | Katzenstein ........................... | 219/617 |
| 4,531,393 | 7/1985 | Weir . | |
| 4,549,684 | 10/1985 | Telly et al. . | |
| 4,715,523 | 12/1987 | Lebedev et al. . | |
| 4,807,351 | 2/1989 | Berg et al. . | |
| 4,817,814 | 4/1989 | Coto et al. . | |
| 4,821,944 | 4/1989 | Tsumura . | |
| 4,930,204 | 6/1990 | Schurter . | |
| 4,947,667 | 8/1990 | Gunkel et al. . | |
| 4,962,656 | 10/1990 | Kunerth et al. . | |
| 5,079,399 | 1/1992 | Itoh et al. ............................. | 219/662 |
| 5,314,105 | 5/1994 | Farassat . | |
| 5,322,205 | 6/1994 | Kato et al. . | |
| 5,353,617 | 10/1994 | Cherian et al. . | |
| 5,442,846 | 8/1995 | Snaper . | |
| 5,444,963 | 8/1995 | Steingroever et al. . | |

OTHER PUBLICATIONS

M.B. Cenanovic, "Magnetic Metal Forming by Reversed Electromagnetic Forces", Jun. 1983, pp. 83–86.

*Primary Examiner*—Philip H. Leung
*Attorney, Agent, or Firm*—Wigman, Cohen, Leitner & Myers, PC

[57] ABSTRACT

A method of joining or welding of at least a portion of a first metal workpiece to at least a portion of one or more second metal workpieces, comprising inducing movement in said portion of the first workpiece by means of a pulsed magnetic force so as to impact said portion of the second workpiece, the movement imparting a kinetic energy on the at least portion of the first workpiece to cause the two at least portions to join or weld to one another.

12 Claims, 8 Drawing Sheets

JOINING OR WELDING OF METAL OBJECTS BY A PULSED MAGNETIC FORCE

FIELD OF THE INVENTION

The present invention is generally in the field of metal works and relates to a method and apparatus for working of metallic workpieces. The present invention relates particularly to such method and apparatus for working of metallic workpieces by a pulsed magnetic energy.

BACKGROUND OF THE INVENTION AND PRIOR ART

Pulsed magnetic forming (PMF) is a process in which a metal workpiece or a portion thereof is put into a rapid motion by a pulsed magnetic field which causes the workpiece to deform. One advantage of the PMF process is in that the specific heat in this process is minimal and consequently there is no or very little heating of the workpiece. In addition, this process does not have the disadvantage of leaving tool marks, as is the case in a variety of other techniques (see M. Cenanovic, Magnetic Metal Forming by Reverse Electromagnetic Forces. In Proceedings of the Fourth IEEE Pulse Power Conference, Institute of Electrical and Electronic Engineering, 1983).

The PMF process uses a bank capacitor, a forming coil and often a field shaper for creating an intense magnetic field. The very intense magnetic field required for the PMF process is created, by very rapid discharge of electric energy, stored in the bank capacitor, into the forming coil. The resulting eddy currents that are induced in the workpiece yield magnetic repulsion between the workpiece and the forming coil, and since the forming coil is firmly supported in its position, the repulsion causes the workpiece to deform.

As the workpiece surface moves under the influence of the repulsion force, it absorbs energy from the magnetic field. In order to apply most of the available energy to forming and reduce energy losses due to permeation of energy into the workpiece material (which cause energy waste by resistance heating), the forming magnetic pulse is made to be very short. In most PMF applications, the pulses have a duration between about 10 to about 250 $\mu$sec. (duration of the first wave of the discharging current).

Background on prior art apparatuses and methods for working of metal workpieces by the PMF process can be found in the following U.S. patents: U.S. Pat. Nos. 3,654,787 (Brower), 3,961,739 (Leftheris), 4,170,887 (Baranov), 4,531,393 (Weir), 4,807,351 (Berg et al.), 5,353,617 (Cherian et al.) and 5,442,846 (Snaper).

GLOSSARY

In the following text, with the aim of streamlining the description and facilitate better understanding of the invention, use will at times be made with the following terms:

First workpiece—a metal object which has at least a portion which is put into rapid motion by a pulsed magnetic force, and consequently it joins or welds with the second workpiece (see below).

Second workpiece—a metal object to which at least portion of the first workpiece joins or welds.

Working—a process which is a result of work applied on the surface of the first workpiece or on a portion thereof. Working, in accordance with the invention, in addition to causing a change in shape of the first workpiece, brings to joining or welding of the first workpiece or portion to the second workpiece or to a portion thereof.

Joining—working of a workpiece so as to cause it to come into very tight contact with the second workpiece. Joining, for example, may be an act of constriction of an essentially tubular workpiece against a metallic cylindrical object within the workpiece's interior so as to very strongly and essentially permanently force opposite surfaces of the two objects against one another. The purpose of joining may, for example, be to ensure tight electrical connection, i.e. with minimal electrical resistance, between the two objects.

Welding—forming of the first workpiece in a manner that the two opposite surfaces of the first and the second workpieces become integrated with one another. In welding these two surfaces are in fact melted and then solidify together to become integral.

GENERAL DESCRIPTION OF THE INVENTION

The present invention is based on the discovery that the PMF process may be used to advantage of joining or welding of two or more metal workpieces to one another. In accordance with a preferred embodiment of the invention, this is achieved by causing a surface of a first of the two workpieces to move rapidly towards a surface of the other workpiece by means of a pulsed magnetic force, and controlling the conditions such that after the respective surface of the first workpiece impacts with the respective surface of the second workpiece, the two surfaces become joined or welded to one another. The magnetic energy may be controlled such that the speed of the moving workpiece imparts a kinetic energy to this workpiece, prior to impact with the second workpiece, which is larger than the sum of the plastic deformation energy of the first, moving workpiece and of the elastic deformation energy of the second, still workpiece, after the impact.

The invention provides a novel process for joining or welding workpieces, as well as workpieces which are joined or welded by means of a PMF process. The process of the invention allows the manufacture of some objects which are novel per se, e.g. a joint of cable and a cable lug in which the filaments or wires are compacted with very little void space (being essentially zero), i.e. the filaments or wires fill essentially the entire lumen in which they are contained; or a super conductor cable having filament embedded in a cable sheath or matrix with very little void space; joints between two super conductor cables; a novel grounding cable or pole; etc. Such novel objects, regardless of the manner in which they are produced, also form an aspect of the invention.

The invention thus provides a method of joining or welding of at least a portion of a first metal workpiece to at least a portion of one or more second metal workpieces, comprising inducing movement in said portion of the first workpiece by means of a pulsed magnetic force so as to impact said portion of the second workpiece, the movement imparting a kinetic energy on the at least portion of the first workpiece to cause the two at least portions to join or weld to one another.

The invention thus provides, by a preferred embodiment, a method for joining or welding of two metal workpieces, comprising:

(a) bringing the two metal workpieces into proximity to one another such that a first surface or a portion thereof in a first of the two workpiece which is to be joined or welded to a second surface or portion thereof in a second of the two workpieces, is opposite said second surface or portion;

(b) forcing at least a portion of the first workpiece which comprises said first surface or said portion, towards the second workpiece by means of a pulsed magnetic force, the force being such so as to cause a portion of the first workpiece to impact onto said second workpiece with an initial kinetic energy prior to impact which is equal to or larger than the combined plastic deformation energy of the first workpiece, and elastic deformation energy of the second workpiece after the impact; whereby the two workpieces become joined or welded to one another.

In accordance with the present invention, the two workpieces or portions thereof which are to be joined or welded to one another, are placed so that opposing surfaces either touch or are proximal to one another. The PMF force is then applied from a forming coil situated proximal to a surface of the first workpiece other than that which is opposite a corresponding surface in the second workpiece which causes movement of the respective surfaces of the first workpiece. (It should be noted that even where the two workpieces touch one another, there is sufficient spacing between the two surfaces on a microscopic level to allow acceleration and build-up of kinetic energy by the at least portion of the first workpiece).

In accordance with one embodiment of the invention, each of the two metal workpieces is, independently, either an elongated object or has at least an elongated portion, the two workpieces being joined or welded to one another at the at least elongated portion. In accordance with this embodiment, at least the first workpiece is a hollow elongated object or has a hollow elongated portion, and the dimensions of the two workpieces or portions being initially such that they can fit one into the other. The method according to this embodiment comprises:

(a) inserting the at least elongated portions of one of the two workpieces, into a hollow interior of the other;

(b) causing surfaces of the at least elongated portion of the first workpiece to move towards opposite surfaces of the at least elongated portion of the second workpiece by means of a pulsed magnetic force, so as to cause the surfaces of the at least elongated portion of the first workpiece to impact the opposite surfaces of the at least elongated portion of the second workpiece at a velocity such that the kinetic energy of the moving surfaces of the at least elongated portion of the first workpiece prior to the impact will be larger than a combination of the plastic deformation energy of the moving at least elongated portion of the first workpiece and the elastic deformation energy of the at least elongated portion of the second workpiece, after the impact; whereby the at least elongated portions of the two workpieces will become joined or welded to one another.

Examples of this embodiment is the joining of an electric cable with a cylindrical workpiece or a portion of the workpiece, e.g. joining of a cable with a cable lug; joining of two elongated objects, e.g. two electric cables or two poles, by means of a tubular joining member.

In accordance with another embodiment of the invention, the two workpieces are essentially planar or have at least a planar portion, with the two at least planar portions being welded to one another. Examples of this embodiment are the joining or welding of one metal board to another, welding of an end of one metal band or foil to the end of another metal band or foil, etc.

A further embodiment of the invention is concerned with the production of super conductor cables or wires. Such cables have a matrix, envelope or jacket made from one alloy, e.g. aluminum or copper, and have filaments made from another alloy, e.g. niobium or titanium-niobium alloys, which are contained within a lumen or longitudinal bore in the cable. In accordance with the invention, such a composite cable or wire is prepared by inserting filaments within longitudinal bores or hollow lumen of a cable or wire which is then constricted by means of a PMF process. As a result, a very tight composite cable or fiber is obtained with very little void space.

At times, the filaments are by themselves a composite structure, and may also be prepared by a PMF process in accordance with the invention.

A still further embodiment of the invention concerns the production of a ground lead or cable, particularly such having an internal metal core unsheathed by an insulating material, at times encased within another metal sheath.

The PMF process of the invention may also be used, in accordance with other embodiments, for joining or welding of a first, planar workpiece, to a second, spherical workpiece.

As will be appreciated, the above embodiments are only some examples of myriad of embodiments all being within the scope of the invention as defined herein.

The invention also provides a device useful in the above method. The device of the invention comprises a power source, one or more bank capacitors, and a current control circuitry and a forming coil.

The overall form and dimensions of the forming coil in the device of the invention will determine the worked-on portion of the first workpiece which joins or welds to the second workpiece as well as, at times, the final shape of the worked-on workpiece. For example, in case of joining or welding of two planar workpieces, the size and shape of the planar forming coil will determine the size and shape of the area of the first workpiece which is being worked and which then welds to the second workpiece. In case of joining or welding of two elongated workpieces or portions, the length of the coil will determine the length of the portion which welds to or joins with the second workpiece. Furthermore, the cross-sectional shape of the forming coil will be a determining factor influencing the final cross-sectional shape of the first workpiece after working thereof. For example, in joining together of two tubular objects, where the forming coil has a hexagonal cross-sectional shape, the final shape of the first workpiece after joining to the second workpiece will often be hexagonal.

The carrying out of the invention will now be illustrated further by means of joining or welding together two essentially cylindrical objects.

The first workpiece or said portion thereof is preferably cylindrical, although it may also be prismatic, may have an elliptical or oval cross-sectional shape, etc. The second workpiece is also preferably cylindrical, but similarly as the first workpiece it can also have a variety of cross-sectional shapes other than circular. The second workpiece may have a cross-sectional shape similar to the first workpiece, i.e. both will have a circular cross-sectional shape, both will have a hexagonal cross-sectional shape, etc. However, the first and second workpiece may also have different cross-sectional shapes, e.g. the first workpiece will be cylindrical and the second workpiece will be prismatic.

In each case, the respective dimensions of the two workpieces should be such to allow either insertion of the second workpiece into the lumen of the first workpiece or the insertion of the first workpiece into the lumen of the second workpiece.

The first workpiece is moved by a magnetic force induced by a coil proximal to one of its surfaces other than the surface which welds or joins to the opposite surface in the second workpiece. In one embodiment of the invention, the second workpiece is inserted within the first workpiece and the first workpiece or portion thereof is then constricted onto the second workpiece, by a magnetic coil surrounding its external surface. In accordance with another embodiment, the first workpiece is inserted into a lumen of the second workpiece and then expanded by a magnetic force from a coil adjacent its interior surface so as to cause it to impart into and then join with the walls of the surrounding second workpiece.

In constriction of a prismatic hollow object, edges are more resistant to the constriction forces than other side portions. The extra force required for constriction is reduced with increase in the angle, i.e. increase in the number of sides. For example, edges of an octagonal object are less resistant to constriction forces than edges of a hexagonal object which is in turn less resistant to constriction than a pentagonal or a rectangular object. The forces required for constriction of a prismatic object may also be reduced by rounding the edges.

In the following, the invention will be described with reference to a preferred embodiment in which both first and second workpieces are cylindrical.

In accordance with the invention, one of the cylindrical workpieces is caused to move, with a large acceleration, by a pulsed magnetic force. At the moment of impact with the other workpiece, the kinetic energy of the first, moving workpiece is at least equal to the sum of the plastic deformation energy of the moving workpiece after the impact and the elastic deformation energy of the second, still workpiece. This may be represented by the following approximate Equation (1):

$$U \geq \sqrt{(A_1 + A_2)/m_1} \qquad (1)$$

wherein

U is the velocity of the moving surface of the first, moving workpiece, prior to the impact, $m_1$ is the mass of the moving workpiece or if not the entire workpiece is being deformed then the mass of the worked portion, and $A_1$ and $A_2$ are the plastic deformation energy of the first, moving workpiece, and the elastic deformation energy of the second, still workpiece, respectively, which may be calculated according to the following approximate Equations (2) and (3):

$$A_1 = \sigma_1 V_1 e^{ln(1/(1+\delta_1))}/(r_{01}/r_1 - 1) \qquad (2)$$

$$A_1 = \sigma_1 V_1 e^{ln(1/(1+\delta_1))}/(r_{02}/r_2 - 1) \qquad (3)$$

wherein $r_{01}$ and $r_{02}$, are, respectively, the radii of the first and second workpieces of said portion prior to the deformation, $r_1$ and $r_2$ are, respectively, the radii of the first and second workpieces of said portion after deformation, $\sigma_1$ and $\sigma_2$ are the tensile strength of the material, $V_1$ and $V_2$ are, respectively, the volumes enclosed within the first and within the second workpiece or within said portions after the deformation, and $\delta_1$ and $\delta_2$ are the relative extension of the first and the second workpiece, respectively, calculated according to the following Equations (4) and (5):

$$\delta_1 = \left| \frac{r_{01} - r_1}{r_{01}} \right| \qquad (4)$$

$$\delta_2 = \left| \frac{r_{02} - r_2}{r_{02}} \right| \qquad (5)$$

Based on the above energy requirements ($A_1$ and $A_2$), the working voltage (V) may be calculated by the following Equations (6) and (7):

$$W = \frac{km_1 U^2}{4\pi\mu_0 r_{01} l_1 h} \qquad (6)$$

$$V = \sqrt{\frac{2W}{C}} \qquad (7)$$

where

W is the energy stored in the capacitor battery, k is a coefficient which depends on the parameters of the PMF device (including capacitance and own inductance) and parameters of working coil, and $m_1$ and $r_{01}$ are as above, l is the length of the working coil (and also the length of the deforming section of the workpiece), h is the thickness of the space between the working coil and the workpiece.

Where the object is other than cylindrical, it may at times be necessary to utilize somewhat altered parameters of the pulsed magnetic energy. For such objects it is necessary to define $A_1$ and $A_2$ and thereafter the velocity and the voltage can be determined using Equations (6) and (7). For example, where a prismatic hollow object is constricted onto a cylindrical object in its interior, typically a somewhat stronger magnetic force will be required in view of the increased resistance of the edges to deformation. In addition, as will be appreciated, the above equations are applicable for a situation where the tubular objects or portion is being deformed is larger than the tube's diameter; where a portion which is smaller than the tube's diameter, some corrections in view of resistance towards deformations by both extreme ends of the deformed portion should be taken into account.

The kinetic energy which will be imparted on the moving, first workpiece, will determine whether the first and the second workpiece will join or weld to one another. Generally, larger kinetic energy will result in welding and smaller in joining. Typically, where the moving speed of the surfaces of the first workpiece are less than 300 meters/second, the first and second workpieces will be joined to one another. Where the moving speed of the surfaces of the first workpiece is more than 300 meters/second, the surfaces of the first and second workpieces which come into contact, may become welded to one another. For welding, it is usually preferred to maintain some space between the opposite surfaces of the first and the second workpiece to allow said surface of the first workpiece to accelerate and achieve the desired speed for welding. For welding it is usually preferred that the non-moving, second workpiece will be firmly immobilized so as to stay essentially motionless at the time of impact of the first workpiece therewith.

At times it may be desired to induce movement of the at least portion by several magnetic pulses one after the other rather than by a single magnetic pulse. This may be achieved, for example, in a device having a plurality of current discharge circuits, each of which being activated at different times. Such a device is novel and also forms an aspect of the invention.

In the following, the invention will be exemplified by non-limiting specific embodiments, with occasional reference to the annexed drawings.

BRIEF DESCRIPTION OF THE DRAWINGS

FIG. 1 is a perspective view of an assembly consisting of a cable and a cable lug after insertion of the end of the cable into the lumen of the cable lug;

FIG. 2 is an upper, partially cross-sectional view of the assembly of FIG. 1;

FIG. 3 is a cross-section through lines 3—3 in FIG. 2;

FIG. 4 is an upper, partially cross-sectional view of the assembly after constriction of the cylindrical portion of the cable lug and the formation of a firm joint between the cable and the cable lug;

FIG. 5 is a cross-section through lines 5—5 in FIG. 4;

DESCRIPTION OF SPECIFIC EMBODIMENTS

Figure 1:
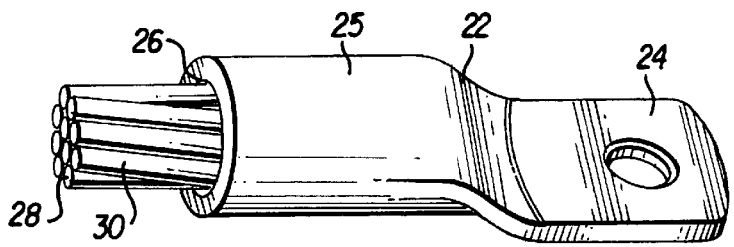
FIGS. 1–5 show a sequence of joining together of a multi-fiber cable and a cable lug.

Reference is first being made to FIGS. 1–5 which show the manner of joining of a cable to a cable lug in accordance with the invention. Cable lug 22 comprises an attachment base 24 for attachment to another body, and an essentially tubular portion 25 with a lumen 26. Cable 28 comprises a plurality of conductor fibers 30 each having an essentially cylindrical cross-section.

Figure 2:
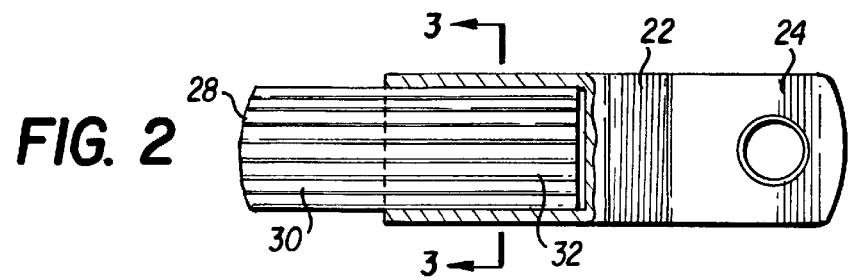
Figure 3:
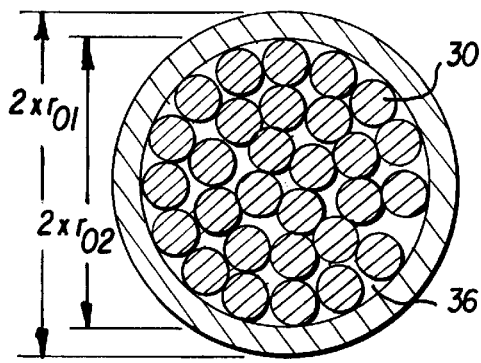

Cable 28 and cable lug 22 are combined by inserting end portion 32 of the cable into lumen 26 of the cable lug as can be seen in FIGS. 1–3. The cylindrical portion 24 has an original radius $r_{01}$ and the cable has an original radius $r_{02}$.

Figure 4:
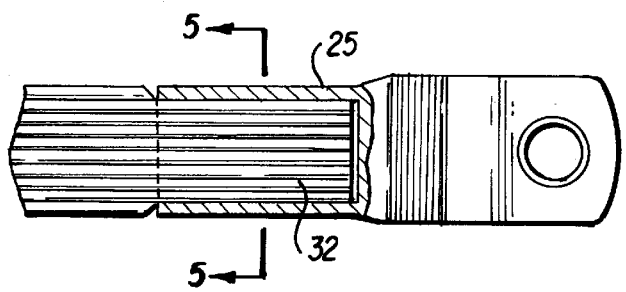

In order to join the cable with the cable lug, a pulsed magnetic force is applied onto the cylindrical portion 24 and consequently, the cylindrical portion 24 becomes constricted whereby the inner faces thereof become joined with the end portion 32 of cable 28, as can be seen in FIG. 4.

Figure 5:
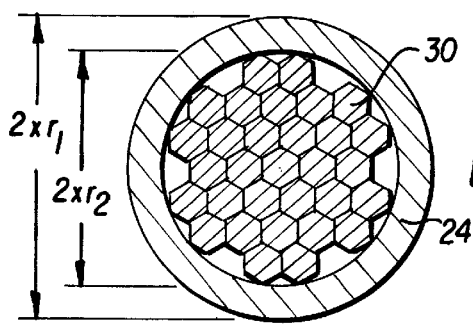

As a result of this constriction, shown in FIG. 5, fibers 30 are compressed to become hexagonal. After constriction the cylindrical portion 24', has a radius $r_1$ and the cable has a radius $r_2$. Following constriction, there is some thickening of the walls of the constricted tubular portion 24'.

In a typical cable, fibers fill up about 65% of its internal space. After full compression, whereby the fibers become hexagonal, the fibers come to fill essentially 100% of the internal space of the cable. This means that the cable after full compression constricts to about 80% of its original diameter.

Accordingly, by knowing $r_{02}$, $r_2$ may be calculated as being equal to about 80% of $r_{02}$. $r_2$ is equal to the internal radius of portion 25 after constriction, and by knowing the original wall's thickness of portion 25, the wall thickness after constriction may be calculated and from there $r_1$ (the radius of cylindrical portion 25 (after constriction) may be derived. Then, by employing the above Equations 1–5, the magnetic parameters required for this process may be calculated.

Figure 6:
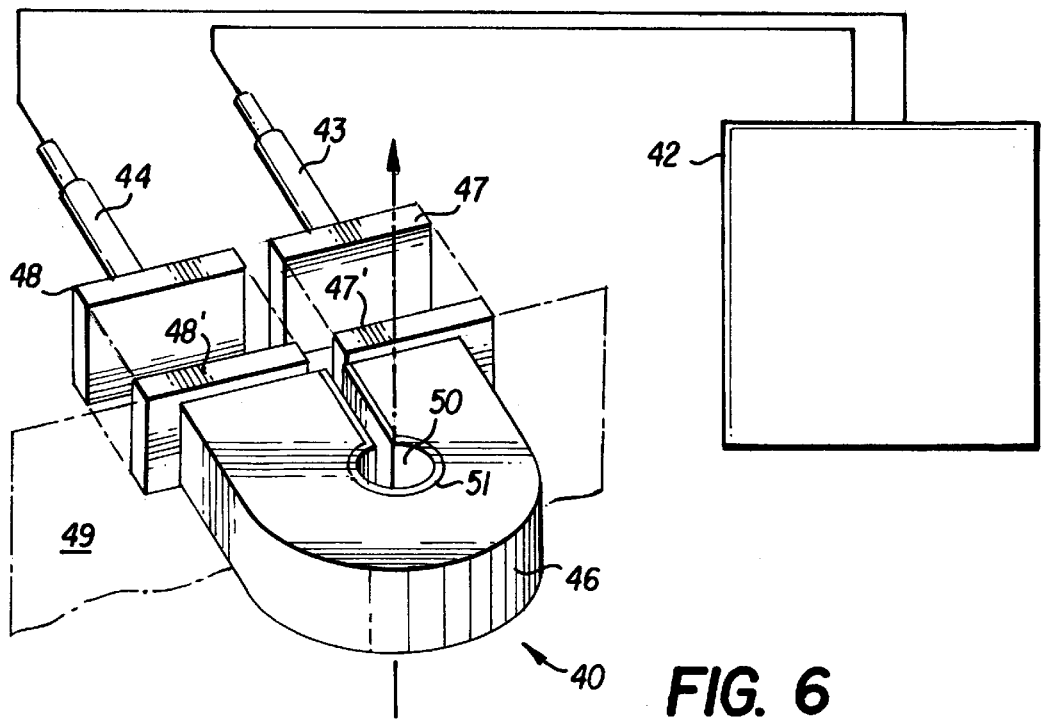
FIG. 6 shows a PMF device in accordance with an embodiment of the invention useful, inter alia, for the preparation of a joint between a cable and a cable lug as shown in FIGS. 1–5.
Figure 6:
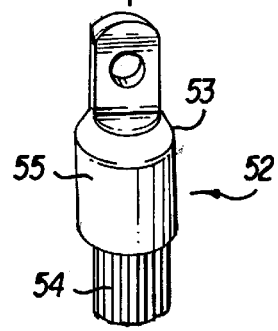

Reference is now being made to FIG. 6 showing, in a semi-schematical manner, a device suitable for carrying out the process as described in FIGS. 1–5. The device generally designated 40 comprises a control module 42 which can provide a rapid intense current discharge, electric leads 43 and 44 for the transfer of the current, forming coil 46. Electric leads 43 and 44 are electrically linked to coil 46 by means of connectors 47 and 47' and 48 and 48'. Typically, the forming coil 46 protrudes from a surface, e.g. a working table, represented here by a dotted-lined surface 49, with the rest of the device constituents being hidden behind the surface. Forming coil 46 has a lumen 50 to which a workpiece to be constricted is inserted. The internal walls of coil 46 are typically lined by insulating lining material 51.

In this specific embodiment, device 40 is used for producing of a joint between a cable and a cable lug shown in FIGS. 1–5. As will be appreciated, the device can also be used for a variety of other purposes, e.g. preparation of a grounding cable, a super conductor cable, joining of two super conductor cables, and a variety of other purposes some of which are described below. The width of coil 46 determines the length of a workpiece which will be worked when current is discharged through coil 46.

In this specific embodiment, an assembly 52 which comprises a cable lug 53 and a cable 54, which are in loose association with one another, is inserted into lumen 50 in a manner that the cylindrical portion 55 of cable lug 53 is essentially entirely within lumen 50. Then, a strong current is rapidly discharged through coil 56 and the pulsed magnetic force which arises in consequence thereto, brings to constriction of the walls of cylindrical portion 55 onto the end of cable 54, whereby the two become firmly joined to one another.

Figure 7:
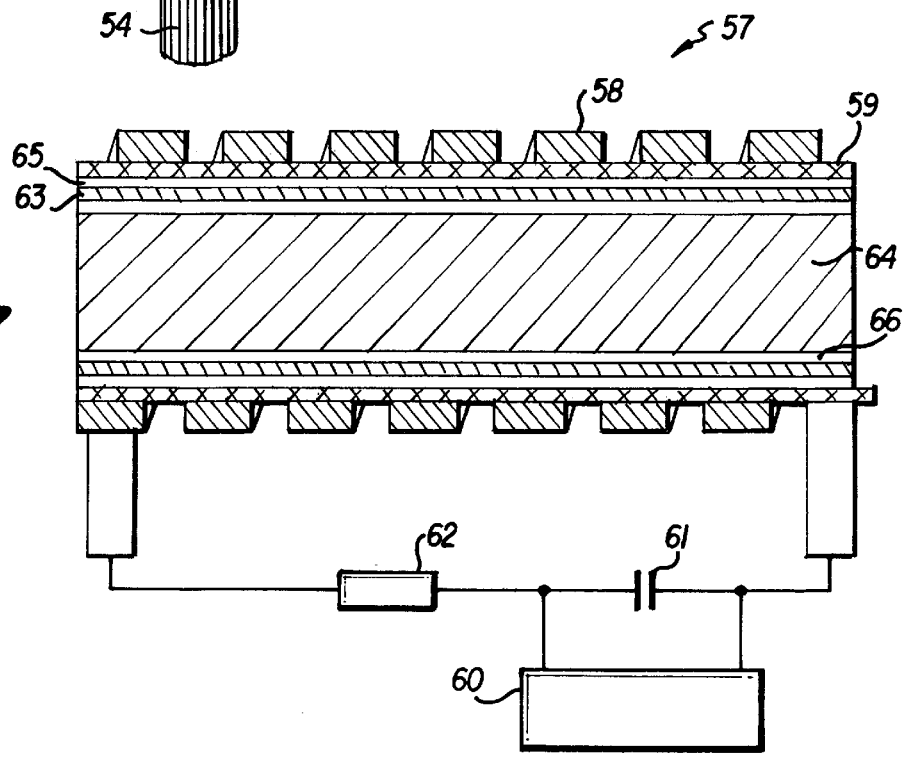
FIG. 7 shows a device in accordance with another embodiment of the invention.

FIG. 7 shows a device in accordance with another embodiment of the invention which in this specific example is used for welding or joining of a tube onto a rod. Similarly as in the embodiment shown in FIG. 6, it is clear that this device may also be used for a variety of other purposes, The device, generally designated 57 comprises a forming coil 58 having a plurality of winds (7 in this specific example) around a tube 59 which is made of insulating material such as plastic. The device further comprises a power supply 60 connected in parallel to a capacitor battery 61 and a switch 62. The power generator 60 charges capacitor 61 and following actuation by means of switch 62 a current is discharged through forming coil 58.

The two workpieces to be joined together which consist, in this example, of a metal tube 63 and a metal rod 64 are inserted within lumen 65 of insulated tube 59, In order to weld the two workpieces to one another, there should preferably be some clearance 66 between the two workpieces, typically about 5–20% of the internal diameter of tube 63.

As can be appreciated, upon discharge of capacitor 61, there is a rapid and intense current flow through coil 58 which causes eddy currents in tube 63 which consequently rapidly constricts onto and welds with rod 64. The length of the portion of tube 63 which is being constricted corresponds to the length of coil 58.

Figure 8:
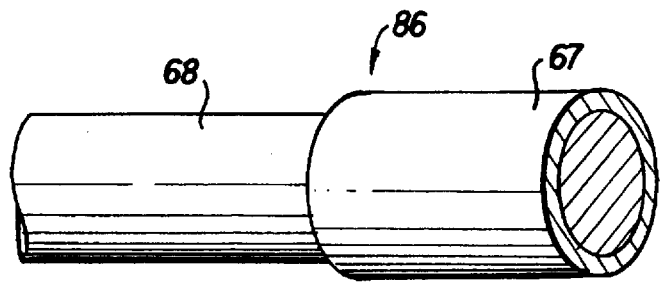
FIG. 8 shows a joint between a cylindrical object and a tube manufactured in accordance with the invention using a device such as that shown in FIG. 7.

FIG. 8 shows a joint 66 between a tube 67 and a rod 68 prepared in a manner described with reference to FIG. 7. Depending on the intensity of the magnetic pressure used to create the joint, and consequently the speed of movement of the cylinder prior to impact with the rod, there will either be welding between the two workpieces or only tight joining.

Figure 9A:
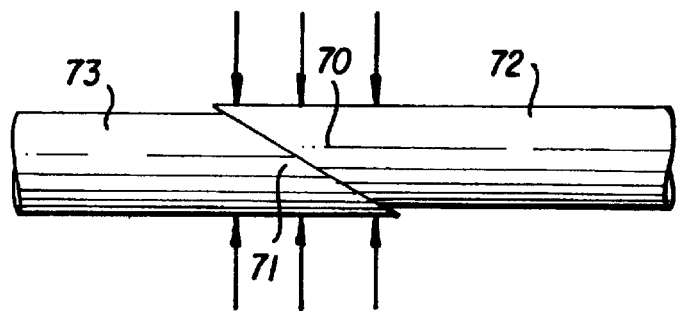
FIG. 9A and 9B show a schematic representation of the manner of joining of two poles, in accordance with an embodiment of the invention.
Figure 9B:
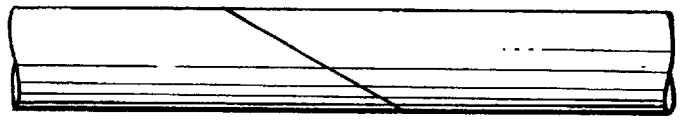

FIGS. 9A and 9B show the manner of joining together of two ends of elongated metal objects in accordance with an embodiment of the invention. The ends 70 and 71 of elongated objects 72 and 73, respectively, is cut or beveled so as to produce two complementary oblique surfaces with a relatively obtuse angle versus the longitudinal axis of the body. The two objects are placed so that their beveled or cut ends touch one another with their axis being slightly out of line with respect to one another. Then, following the application of a strong pulsed magnetic force, as shown schematically by the arrows in FIG. 9A, the two end segments 70 and 71 impart one another and become welded, i.e. integral, with one another.

Figure 10C:
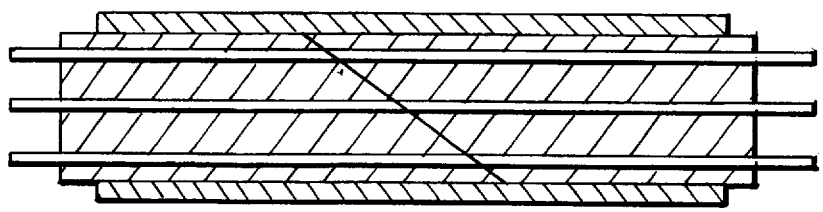
FIGS. 10A, 10B, and 10C show a schematic representation of the manner of joining of two super conductor cables to one another, in accordance with an embodiment of the invention.
Figure 10A:
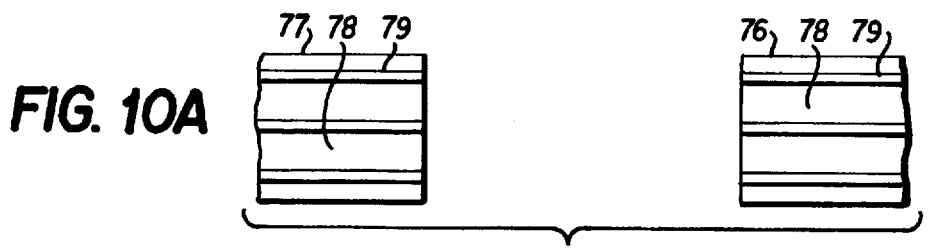
Figure 10B:
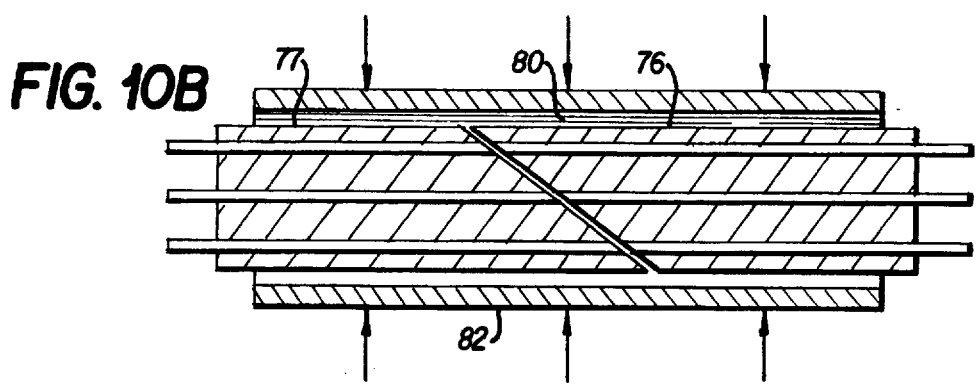

FIGS. 10A–10C show a manner of joining ends of two super conductor cables in accordance with an embodiment of the invention. Two super conductor cables 76 and 77, of which only the end portion is shown, comprise each a metal matrix 78 made from one metal alloy and filaments 79 made of another metal alloy. In order to have proper electrical continuity, it is necessary to join two ends so that the filaments will be coextensive. For this purpose, the ends 76 and 77 of the two cables are cut diagonally similarly as in the case of the rods in FIG. 8 and are brought into contact with one another within lumen 80 of cylindrical workpiece 82 (FIG. 10B). Then by the application of a pulsed magnetic force, represented schematically by the arrows in FIG. 10B, the cylindrical workpiece 82 is constricted onto the super conductor cable and consequently the tight joint between the two cables is obtained as shown in FIG. 10C.

Figure 11D:
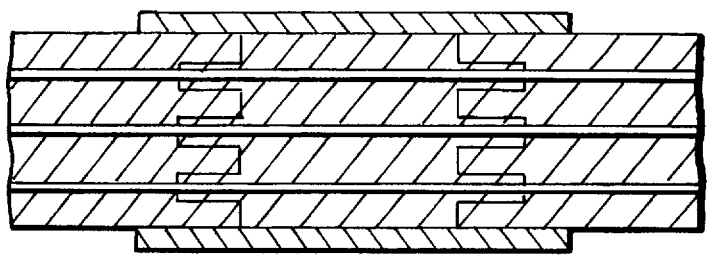
FIGS. 11A, 11B, 11C and 11D show a schematic representation of another embodiment in accordance with the invention for joining of two super conductor cables.
Figure 11A:
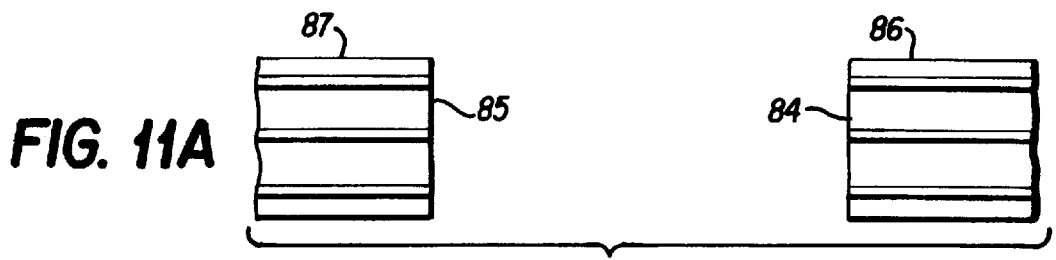
Figure 11B:
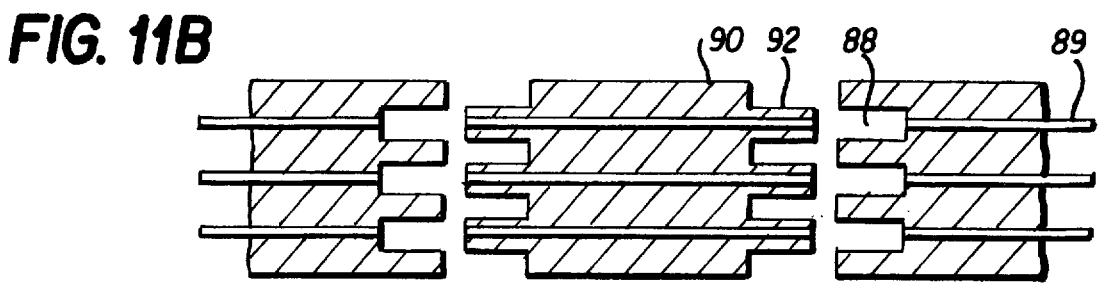
Figure 11C:
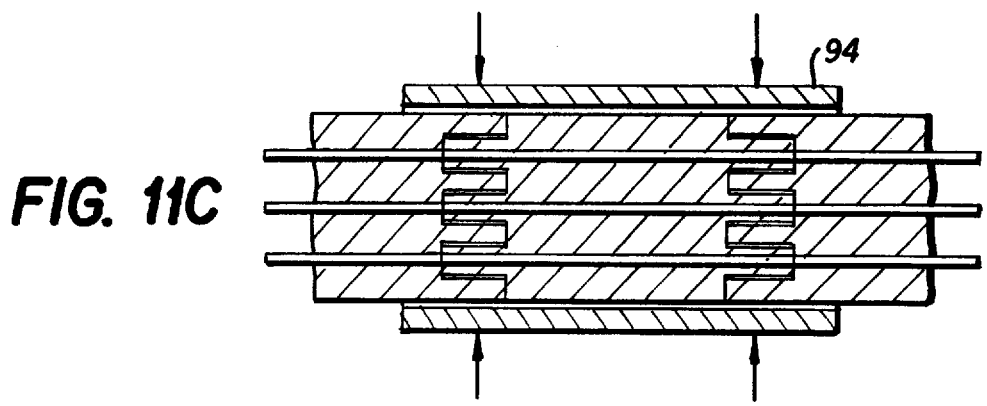

The manner of joining of two super conductor cables in accordance with another embodiment of the invention is shown in FIGS. 11A–11D. The end faces 84 and 85 of cables 86 and 87 respectively, are bored to obtain a plurality of bores 88, each corresponding to a filament 89 of the super conductor cable, as can be seen in FIG. 11B. A joining member 90 comprising projections 92 which correspond to bores 88 is combined with the two ends of the super conductor cables, as shown in FIG. 11C, and then a cylinder 94 is placed over this assembly. Then magnetic force is applied, as shown schematically by the arrows in FIG. 10C, and consequently cylinder 94 is constricted onto the cable and as a result a firm join is obtained, as shown in FIG. 11D.

Figure 12A:
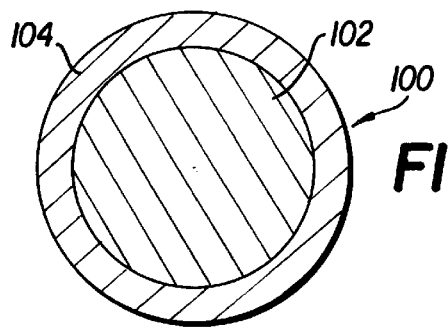
FIGS. 12A, 12B and 12C show a schematic cross-sectional representation of the manner of production of a grounding cable according to an embodiment of the invention.
Figure 12B:
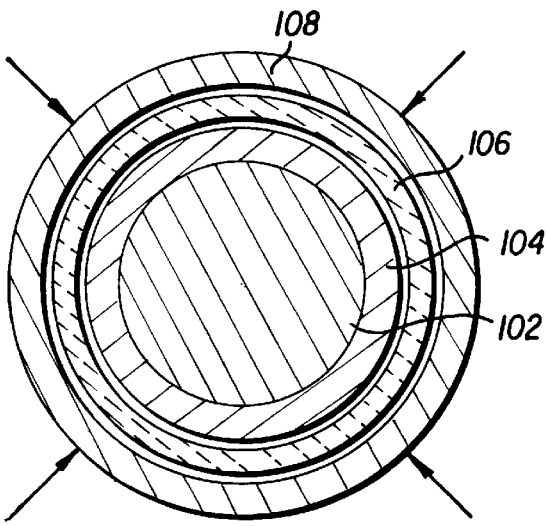
Figure 12C:
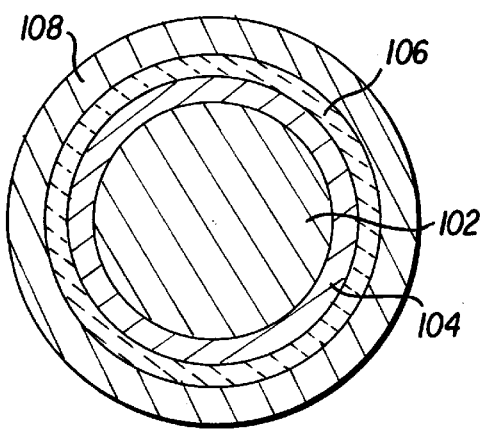

The manner of preparation of a ground cable or lead in accordance with an embodiment of the invention is shown in FIGS. 12A–12C. A conductor 100 shown in FIG. 12A consists of a core 102 made of one alloy, e.g. iron, and a clad 104 made of another alloy, e.g. copper. The conductor 100 may be prepared as explained in relation to FIGS. 7 and 8. A cylinder or envelope made of insulating material such as polyethylene, a ceramic material, etc. is placed over the conductor, the cylinder or envelope being overlaid by a metal, e.g. a copper cylinder, as can be seen in FIG. 12B. Following application of a magnetic force, as represented schematically by the arrows in FIG. 12B, the metal cylinder 108 is constricted, which causes also constriction of insulator 106 so as to achieve the tight structure shown in FIG. 12C.

Figure 13A:
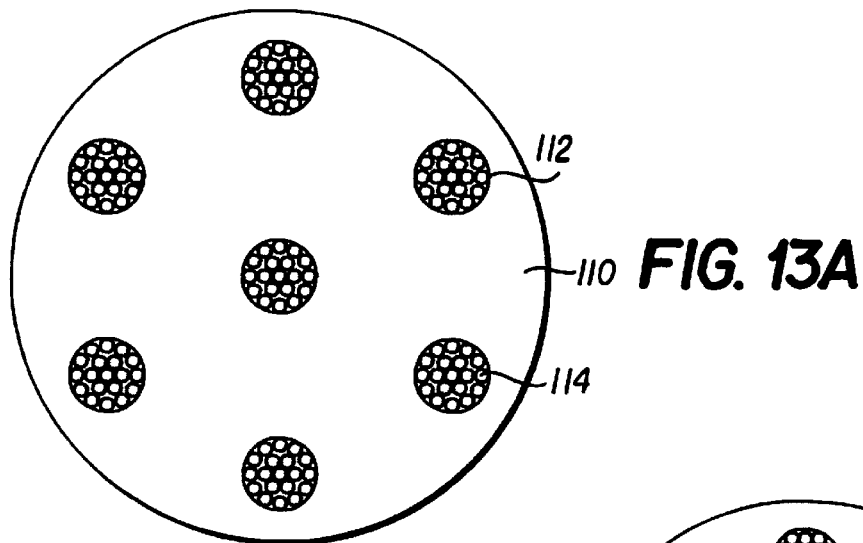
FIGS. 13A and 13B show a schematic cross-sectional representation of the manner of producing a super conductor cable in accordance with the invention.
Figure 13B:
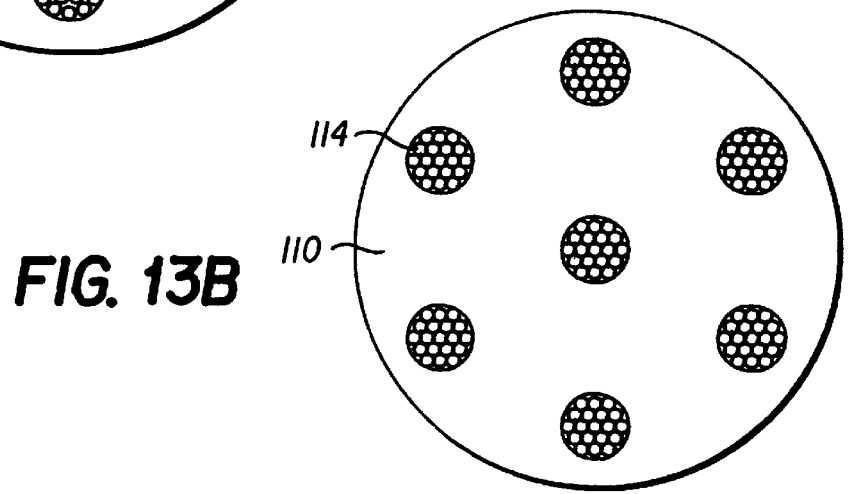

Reference is now being made to FIGS. 13A–13B showing the schematic representation of the manner of producing a super conductor cable in accordance with an embodiment of the invention. A longitudinal matrix 110 which is made of one alloy, e.g. copper, comprises a plurality of longitudinal bores 112, and filaments 114 made from another alloy are introduced into each of the bores, as shown in FIG. 13A. Following the application of a pulsed magnetic force, as represented by the arrows in FIG. 13A, the entire cable is constricted and consequently the walls of each of the bores joins with the filaments to yield a super conductor cable with practically no void space, as can be seen in FIG. 13B.

Figure 14:
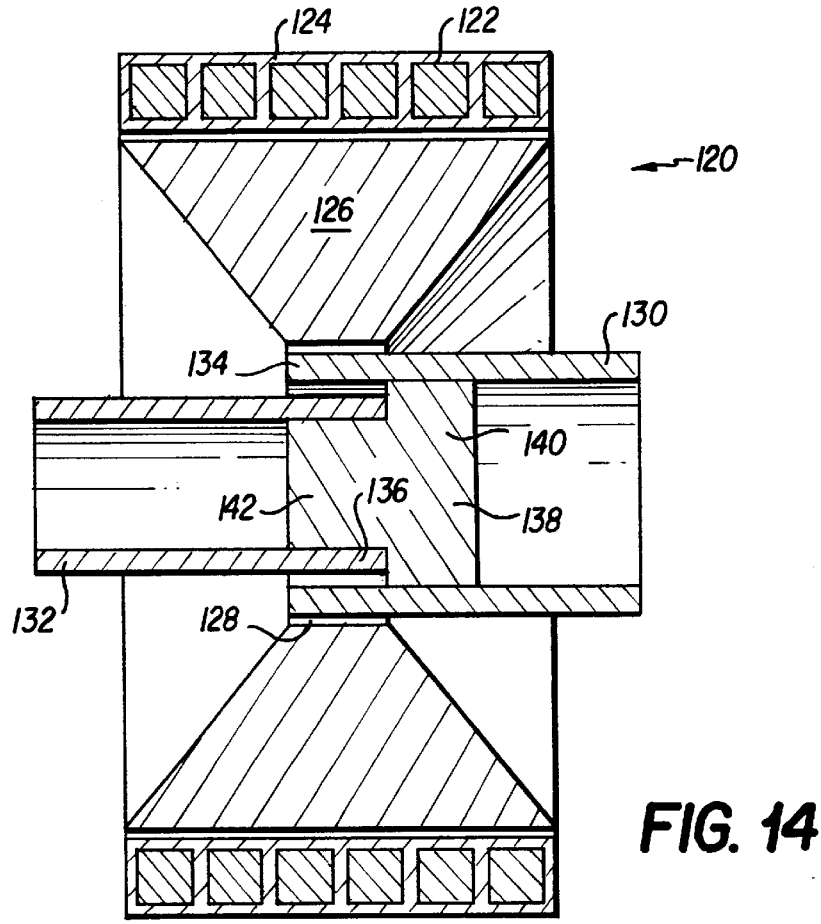
FIG. 14 shows a device in accordance with an embodiment of the invention.

A device in accordance with an embodiment of the invention, for use in joining or welding of elongated objects to one another, is shown in FIG. 14 (in longitudinal cross-sections). The device generally designated 120 comprises a forming coil 122 consisting of a plurality of windings, separated from one another by an insulating material 124. The device also comprises a field shaper 126.

As a result of application of the pulsed magnetic force, a strong magnetic pressure will result in the lumen 128 of the field shaper and as a result, a cylindrical object within the lumen will be constricted.

In the example shown in FIG. 14, two tubular workpieces, consisting of a first workpiece 130 of a wider diameter and a second tubular workpiece 132 of a narrower diameter are shown. These two workpieces have respectively a portion 134 and 136 which are being welded to one another. Insert 138 has a first portion 140 which has a diameter equal to the internal diameter of tubular workpiece 130, and has a second portion 142 which has a diameter equal to the internal diameter of tubular workpiece 130. Insert 138 has several functions: one of which is to ensure proper mutual placing of the two tubular workpieces; another being to ensure that upon application of a pulsed magnetic force, only portion 134 of tubular workpiece 130 will move and constrict; and a further being to support portion 136 to ensure that welding between the two portions will occur. When magnetic force is applied, portion 134 moves rapidly towards portion 136 and upon impact welds therewith.

Support of the internal walls of a tubular workpiece during impact by an external tubular workpiece may also be achieved by a variety of other means. These include, for example, filling the entire cylinder with a non-compressible liquid such as water; introducing into the tube a magnetic liquid such as mercury, oil with suspended metal particles, etc., and then applying a constant magnetic field prior to the PMF so as to concentrate the magnetic liquid at a portion where the support is required; by means of ice frozen at a respective portion; etc. Such solutions of support are required, for example, where the internal cylinder is long and it is thus not possible to introduce an insert such as that shown in FIG. 14.

Figure 16:
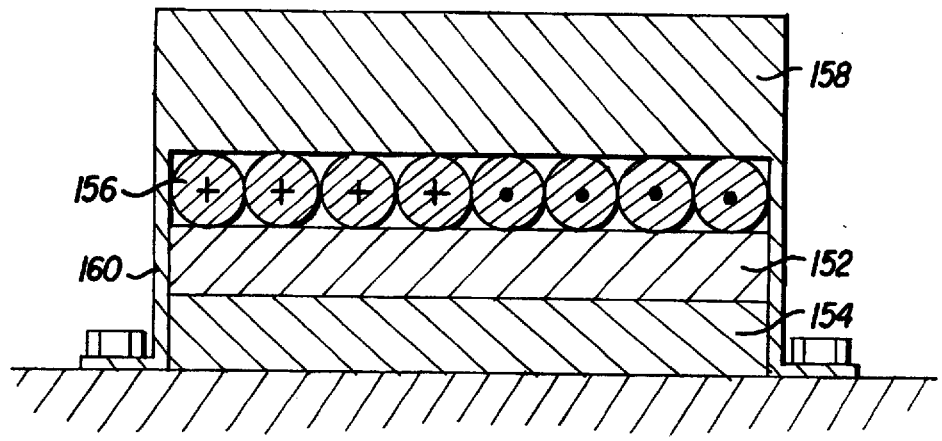
FIG. 16 is a cross-section through lines 16—16 in FIG. 15.
Figure 15:
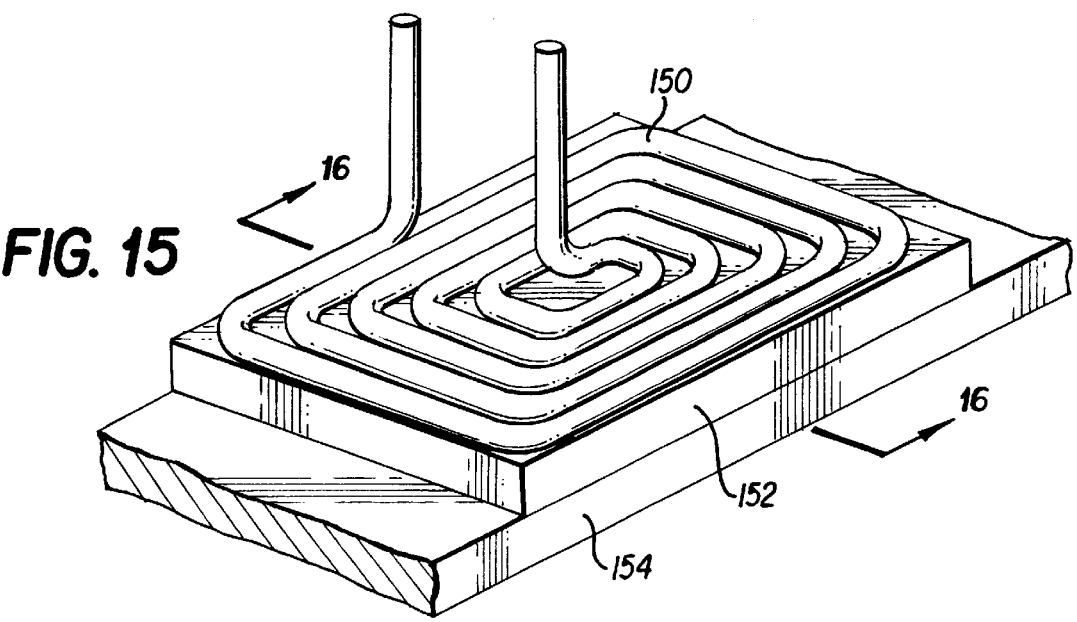
FIG. 15 shows the set-up for welding of two planar metal objects.

A set-up for welding of two planar metal workpieces is shown in a perspective view in FIG. 15 and in a cross-section in FIG. 16 (in FIG. 15, the support structure of the coil has been removed for the purpose of ease of illustration). In order to join two planar workpieces, an essentially planar coil is used. Planar coil 150 shown in FIG. 15 has an overall shape and size substantially the same as the shape and size of the area of the first workpiece 152 which is to be joined with the second workpiece 154. As can be seen in FIG. 16, the coil windings 156 are held in place by support wall 158 which is anchored onto a working stage by means of anchoring member 160. Upon passing of a pulsed current in coil 150, planar workpiece 152 will move rapidly downwards and if it will impact, workpiece 154 sufficiently rapidly, e.g. at a speed above 300M/sec, the two metal workpieces will be welded to one another. For that purpose, a magnetic force is applied from the direction as represented by the arrows in these figures.

Figure 17:
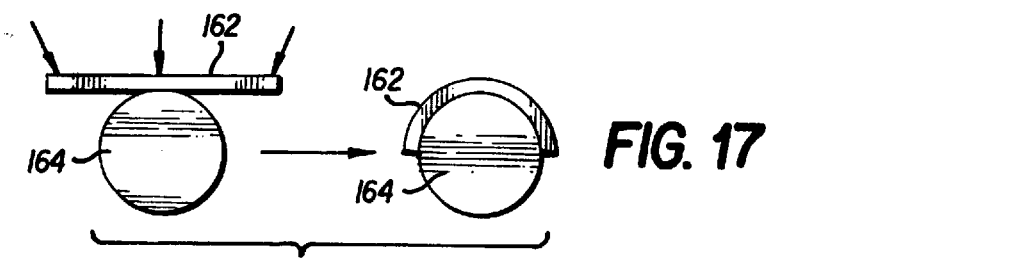
FIGS. 17 and 18 show two embodiments for welding of an initially planar metal workpieces to a spherical metal workpiece.
Figure 18:
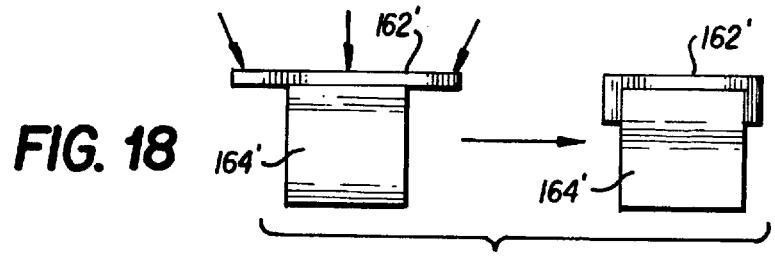

Reference is now being made to FIGS. 17 and 18 showing, schematically, the welding of a planar workpiece 162 and 162' onto spherical objects 164 and 164', which are respectively a cylindrical and a prismatic object (shown in cross-section).

Figure 19:
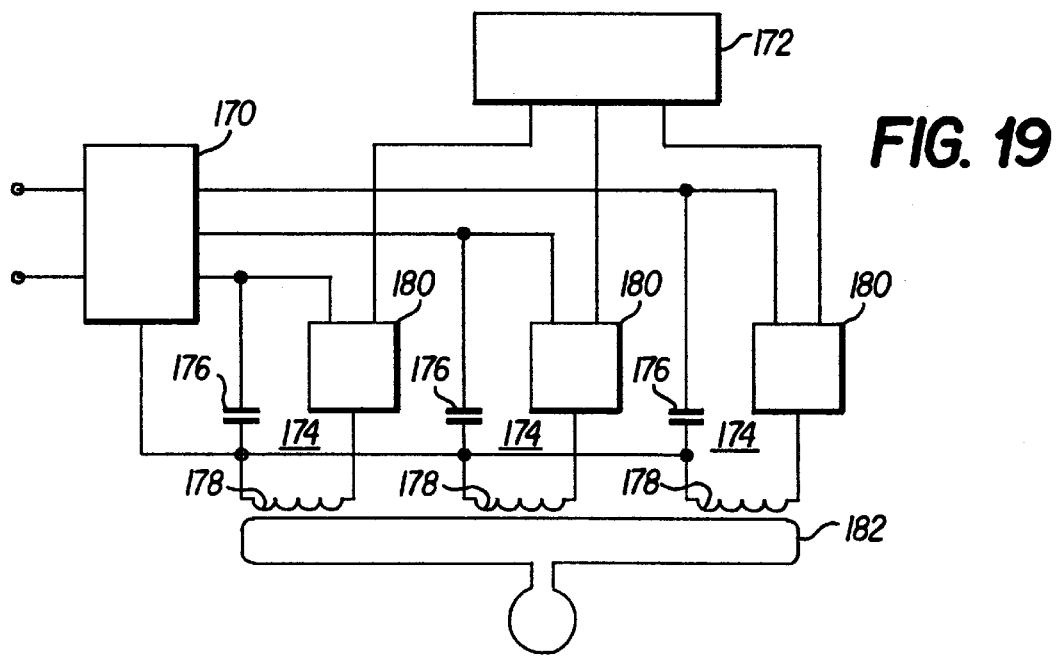
FIG. 19 is a schematic representation of the magnetic conductor circuit operating in a device according to an embodiment of the invention.

Reference is now being made to FIG. 19 showing a block diagram of the electric circuit for the provision of pulsed magnetic force in a device in accordance with an embodiment of the invention. The device comprises a power generator 170, which may be multi-channel as in the depicted embodiment, and one or a plurality of current circuits 174 (three are shown in this embodiment) and a field shaper 182. Each such circuits 174 comprises a capacitor battery 176, a forming coil 178 and a pulsed discharge switch 180. Each of switches 180 is under the control of a multi-channel triggering generator 172.

Electric power, which is provided by power supply 170, accumulates in a capacitor or bank or capacitors 176 and following a trigger provided by generator 172, the accumulated potential discharges through coil 180. A device comprises a plurality of magnetic forming circuits is uniquely provided by the invention. The advantage of such a device is that by proper timing of the triggers to each of the switches 180, a series of pulsed magnetic forces may be applied which may be advantageous for a number of applications.

Figure 20:
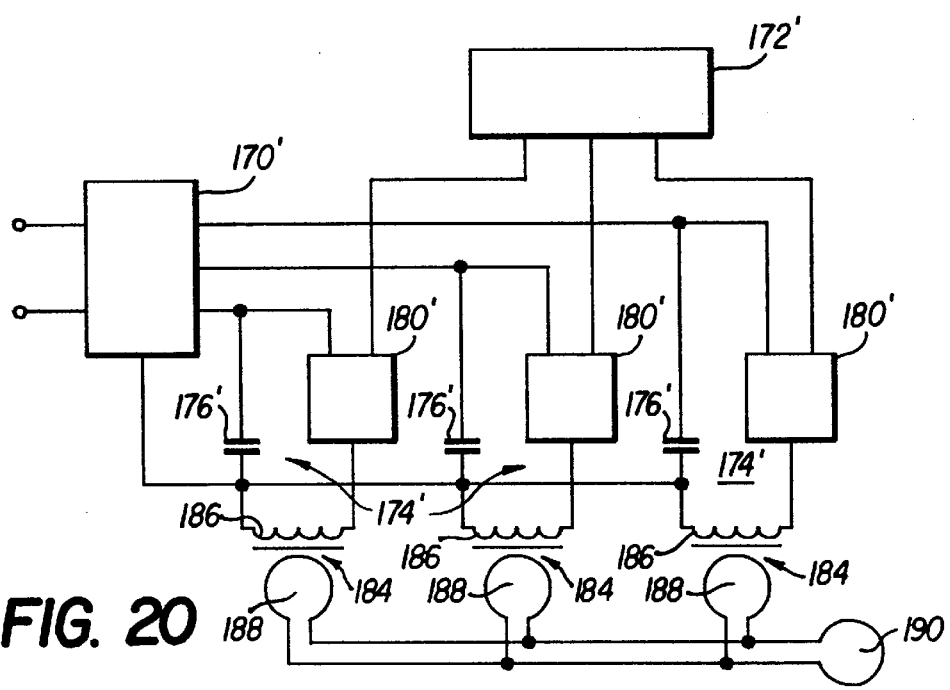
FIG. 20 shows the magnetic conductor circuit in a device in accordance with another embodiment of the invention.

A block diagram of a circuitry in accordance with another embodiment of the invention is shown in FIG. 20. In FIG. 20, like elements to those of FIG. 19 have been given like numbers with a prime indication. This embodiment is particularly useful for providing very intense energies. The device comprises a transformer 184 for each of circuits 174' which comprises a primary coil 186 having a plurality of windings and a secondary coil 188 having a single wind. All the secondary coils 188 are connected in parallel to forming coil 190.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

We claim:

1. A method of joining or welding at least a portion of a first metal workpiece to at least a portion of one or more second metal workpieces, comprising:

(a) bringing the two metal workpieces into proximity to one another such that a first surface or a portion thereof in a first of the two workpieces which is to be joined or welded to a second surface or portion thereof in a second of the two workpieces, is opposite said second surface or portion;

(b) forcing at least a portion of the first workpiece which comprises said first surface or said portion, towards the second workpiece by means of a pulsed magnetic force induced by passing a current pulse through a coil, the force being such so as to cause a portion of the first workpiece to impact onto said second workpiece with an initial kinetic energy of the first workpiece prior to impact which is equal to or larger than the combined plastic deformation energy of the first workpiece, and elastic deformation energy of the second workpiece after the impact; whereby the two workpieces become joined or welded to one another.

2. A method according to claim 1 wherein each of the two metal workpieces is, independently, either an elongated object or has at least an elongated portion, the two workpieces being joined or welded to one another at the at least elongated portion; the dimensions of the two workpieces or portions being initially such that they can fit one into the other; the method comprising:

(a) inserting the at least elongated portions of one of the two workpieces, into a hollow interior of the other;

(b) causing surfaces of the at least elongated portion of the first workpiece to move towards opposite surfaces of the at least elongated portion of the second workpiece by means of a pulsed magnetic force, so as to cause the surfaces of the at least elongated portion of the first workpiece to impact the opposite surfaces of the at least elongated portion of the second workpiece at a velocity such that the kinetic energy of the moving surfaces of the at least elongated portion of the first workpiece prior to the impact will be larger than a combination of the plastic deformation energy of the moving at least elongated portion of the first workpiece and the elastic deformation energy of the at least elongated portion of the second workpiece, after the impact; whereby the at least elongated portions of the two workpieces will become joined or welded to one another.

3. A method according to claim 2, wherein said first workpiece is a cable lug and said second workpiece is a cable.

4. A method according to claim 2, wherein said first workpiece is an envelope or matrix of a super-conductor cable made of one alloy and the second workpiece is one or more filaments made of a second alloy inserted in a lumen or longitudinal bores of the super-conductor cable; the method comprising inserting said filaments in said lumen or bores and then constricting said matrix or envelope by means of said pulsed magnetic force.

5. A method according to claim 2, for the production of a ground lead.

6. A method according to claim 1, wherein the two workpieces are essentially planar or have at least a planar portion, with the two at least planar portions being welded to one another.

7. A method of joining or welding at least a portion of a first metal workpiece to at least a portion of one or more second metal workpieces, each of the two metal workpieces is, independently either an elongated object or has at least an elongated portion, two workpieces being joined or welded to one another at the at least elongated portion; the dimension of the two workpieces or portions being initially such that they can fit one into the other; the method comprising:

(a) inserting the at least elongated portion of one of the two workpieces into a hollow interior of the other;

(b) causing surfaces of the at least elongated portion of the first workpiece to move towards opposite surfaces of the at least elongated portion of the second workpiece at velocity U of the surface of the at least elongated portion of the first workpiece prior to impact with the opposite surface of the second workpiece is approximately represented by the following Equation (1):

$$U \geq \sqrt{(A_1 + A_2)/m_1}$$

wherein

U is the velocity of the moving surface of the first, moving workpiece, prior to the impact, $m_1$ is the mass of the moving workpiece or if not the entire workpiece is being deformed then the mass of the worked portion, and $A_1$ and $A_2$ are the plastic deformation energy of the first, moving workpiece, and the elastic deformation energy of the second, still workpiece, respectively, which may be calculated according to the following approximate Equations (2) and (3):

$$A_1 = \sigma_1 V_1 e^{ln(1/(1+\delta_1))}/(r_{01}/r_1 - 1)$$

$$A_2 = \sigma_1 V_1 e^{ln(1/(1+\delta_1))}/(r_{02}/r_2 - 1)$$

wherein $r_{01}$ and $r_{02}$, are, respectively, the radii of the first and second workpieces of said portion prior to the deformation, $r_1$ and $r_2$, are, respectively, the radii of the first and second workpieces of said portion after deformation, $\sigma_1$ and $\sigma_2$ are the tensile strength of the material, $V_1$ and $V_2$ are, respectively, the volumes enclosed within the first and within the second workpiece or within said portions after the deformation, and $\delta_1$ and $\delta_2$ are the relative extension of the first and the second workpiece, respectively, calculated according to the following Equations (4) and (5):

$$\sigma_1 = \left| \frac{r_{01} - r_1}{r_{01}} \right|$$

$$\sigma_2 = \left| \frac{r_{02} - r_2}{r_{02}} \right|.$$

8. A method according to claim 7, wherein the working voltage V is calculated by the following approximate Equations (6) and (7):

$$W = \frac{k m_1 U^2}{4\pi \mu_0 r_{01} l_1 h} \quad (13)$$

$$V = \sqrt{\frac{2W}{C}} \quad (14)$$

where

W is the energy stored in the capacitor battery, k is a coefficient which depends on the parameters of the PMF device (including capacitance and own inductance) and parameters of working coil, and $m_1$ and $r_{01}$ are as above, l is the length of the working coil (and also the length of the deforming section of the workpiece), h is the thickness of the space between the working coil and the workpiece.

9. A device for joining or welding at least a portion of a first metal workpiece to at least a portion of one or more second metal workpieces, comprising:

a plurality of current discharge circuits each comprising an independent primary coil and comprising a field shaper which is in a current inductive association with the primary coils of each of the plurality of circuits, the field shaper being in proximity with at least a portion of either the first or the second metal workpieces; means for controlling the discharging extent of the current discharge circuits so as to cause a portion of the first workpiece to impact onto said one or more second workpieces with an initial kinetic energy of the first workpiece prior to impact which is equal to or greater than the combined plastic deformation energy of the first workpiece and elastic deformation energy of the one or more second workpieces after the impact.

10. A device according to claim 9, wherein each of the circuits comprising a discharge switch, the device further comprising a triggering generator, the discharge switches of all circuits being controlled by the triggering generator.

11. A device for joining or welding at least a portion of a first metal workpiece to at least a portion of one or more second metal workpieces, comprising;

a plurality of current discharge circuits, each comprising an independent primary coil of a plurality of windings and a secondary coil with a single winding, all secondary coils being connected in parallel to a forming coil of a single wind; means for controlling each current discharge circuit to discharge current through the forming coil so as to yield a pulsed magnetic force to an extent so as to cause a portion of the first workpiece to impact onto said one or more second workpieces with an initial kinetic energy of the first workpiece prior to impact which is equal to or greater than the combined plastic deformation energy of the first workpiece, and the plastic deformation energy of the one or more second workpieces after the impact.

12. A device according to claim 11, wherein each of the circuits comprising a discharge switch, the device further comprising a triggering generator, the discharge switches of all circuits being controlled by the triggering generator.

* * * * *